3,474,136
AMIDES OF POLYHALOPOYLHYDROMETHANO-NAPHTHALENEDICARBOXYLIC ACIDS

Morris Dunkel, Paramus, and Daniel J. Eckhardt, Clifton, N.J., assignors to Universal Oil Products Company, Des Plaines, Ill., a corporation of Delaware
No Drawing. Continuation-in-part of application Ser. No. 329,949, Dec. 12, 1963. This application July 13, 1966, Ser. No. 564,752
Int. Cl. C07c *103/19*
U.S. Cl. 260—514
20 Claims

ABSTRACT OF THE DISCLOSURE

Compounds consisting of the monoamides and diamides of polyhalopolyhydromethanonaphthalenedicarboxylic acids having the formula

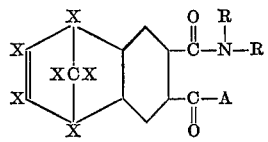

R=H, alkyl, aminoalkyl, polyalkenepolyamino, aryl, aminoaryl, polyarylenepolyamino, aminocycloalkyl, and polycycloalkenepolyamino, A=OR' and

R'=H or alkyl; X is halogen or H. These compounds impart shrink-proofing properties to fibrous material and particularly to wool.

---

This application is a continuation-in-part of our copending application Ser. No. 329,949, filed Dec. 12, 1963, now abandoned.

This invention relates to novel compositions of matter comprising the condensation products of a particular type of a halo-substituted polyhydropolycyclicdicarboxylic acid, anhydride or ester thereof and an amine compound. More particularly, the invention is concerned with novel compositions of matter comprising either mono- or diamides resulting from the condensation of a polyhalopolyhydromethanonaphthalenedicarboxylic acid, anhydride or ester thereof and an amine compound.

It has now been discovered that certain halo-substituted polyhydroalkanonaphthalenedicarboxylic acids, anhydrides or esters thereof may be condensed with certain amine compounds of a type hereinafter set forth in greater detail to form reaction products which will find many and varied uses in the chemical field. For example, the reaction product between an acid, anhydride or ester of the type hereinafter set forth in greater detail and a polyfunctional amine compound, which will be referred to in the present specification and appended claims as an amide of a polyhalopolyhydromethanonaphthalenedicarboxylic acid, said reference to an amide including both monoamides and diamides, may be used as a polyamino in an interfacial polymerization process with a polyfunctional acid chloride, chloroformate or isocyanate in imparting shrink-proofing properties to fibrous materials and particularly to wool. The interfacial polymerization process is effected by treating the fibrous material with an amide containing free amino groups of a polyhalopolyhydromethanonaphthalenedicarboxylic acid and thereafter further treating the fibrous material with a polyacid polyalide containing at least two acid halide groups per molecule, both the amide and polyacid polyhalide being in solutions which are mutually immiscible with one another. The formation of the polymer on the fibrous material and particularly wool will impart a shrink-proofing property to the material as well as many other desirable physical characteristics including smoothness after drying, excellent hand, increased break strength and tear strength as well as improved resistance to abrasion, chemicals and pilling. The use of the amides in the present invention as one of the reactants in forming the polymer is advantageous inasmuch as the fibrous material, and particularly wool, after treatment thereof will not have the desirable characteristics of the fibrous materials altered nor will a post-cure of the material be necessary. Due to the particular structure of the amide of the polyhalopolyhydromethanonaphthalenedicarboxylic acid, the fibrous material will also possess antibacterial, antifungal and insecticidal properties. The products of the present invention, in addition to their use as starting materials in an interfacial polymerization process, may also be utilized as insecticides or as additives to certain polymeric compositions of matter whereby the physical characteristics of the polymers will be altered. In addition to utilizing the polyamino amides of the present invention as curing agents for certain types of resins and specifically epoxy resins, the monoamides may be used as additives for lubricating oils or other types of lubricants.

It is therefore an object of this invention to prepare novel compositions of matter which may be utilized in the chemical industry.

A further object of this invention is to prepare novel compositions of matter comprising amides of polyhalopolyhydromethanonaphthalenedicarboxylic acids.

In one aspect, an embodiment of this invention resides in a compound selected from the group consisting of the monoamides and diamides of a polyhalopolyhydromethanonaphthenedicarboxylic acid having the formula:

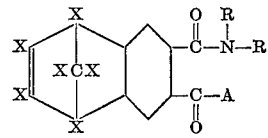

in which R is selected from the group consisting of hydrogen, alkyl and amino alkyl radicals containing from 1 to 20 carbon atoms, polyalkenepolyamino, aryl, aminoaryl, polyarylenepolyamino of from 1 to 3 carbocyclic rings and aminocycloalkyl and polycycloalkenepolyamino radicals having from 4 to 8 carbon atoms in the ring, A is selected from the group consisting of OR' and

in which R' is hydrogen or an alkyl radical of from 1 to 5 carbon atoms and X is selected from the group consisting of hydrogen and halogen radicals, at least two X's being halogen.

Another embodiment of this invention is found in the compound of claim 1 being a compound having the formula:

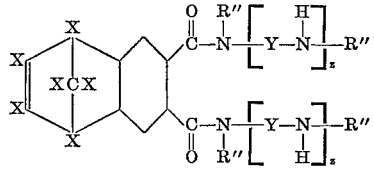

in which Y is a radical selected from the group consisting of alkylene of from 2 to about 6 carbon atoms, phenyl, cyclopentyl and cyclohexyl, R" is selected from the group consisting of hydrogen and alkyl of from 1 to about 5 carbon atoms, X is selected from the group consisting of hydrogen and halogen, at least two X's being halogen and z is an integer of from 1 to about 5.

A specific embodiment of this invention is found in the di(N,N'-di-sec-butyldiethylenediaminoamide) of 5,6,7,8,9,9 - hexachloro-1,2,3,4,4a,5,8,8a-octahydro-5,8-methano-2,3-naphthalenedicarboxylic acid.

Other objects and embodiments will be found in the following further detailed description of this invention.

As hereinbefore set forth, the present invention relates to novel compositions of matter comprising both monoamides and diamides of polyhalopolyhydromethanonaphthalenedicarboxylic acid. These amides may be prepared in a manner hereinafter set forth in greater detail by condensing a polyhalopolyhydromethanonaphthalenedicarboxylic acid, anhydride or ester thereof with an amine compound.

The polyhalopolyhydromethanonaphthalenedicarboxylic acids or anhydrides thereof which comprise one of the starting materials utilized in the present invention may be prepared in any suitable manner such as the Diels-Alder reaction of a conjugated aliphatic diene with an olefinic dicarboxylic acid or anhydride. A specific example of this reaction is the condensation of 1,3-butadiene with maleic anhydride at an elevated temperature in the range of from about 80° to about 250° C. or more and at a pressure sufficient to maintain a major portion of the reactants in the liquid phase to form tetrahydrophthalic anhydride. The tetrahydrophthalic anhydride is then further condensed with a conjugated halocycloalkadiene such as hexachlorocyclopentadiene at similar condensation conditions (temperatures in a range of from about 50° to about 250° C. or more and pressures ranging from atmospheric up to about 100 atmospheres or more, the pressure being sufficient to maintain a major portion of the reactants in the liquid phase at the reaction temperature) to form the desired anhydride. Examples of polyhalopolyhydromethanonaphthalenedicarboxylic acids or anhydrides thereof which may be utilized as a starting material in the present process include 5,6,7,8,9,9 - hexachloro-1,2,3,4,4a,5,8,8a-octahydro-5,8-methano-2,3-naphthalenedicarboxylic acid, 5,6,7,8,9,9 - hexachloro - 1,2,3,4,4a,5,8,8a-octahydro-5,8-methano-2,3-naphthalenedicarboxylic anhydride, 5,6,7,8,9,9,-hexabromo - 1,2,3,4,4a,5,8,8a - octahydro - 5,8-methano-2,3-naphthalenedicarboxylic acid, 5,6,7,8,9,9 - hexabromo-1,2,3,4,4a,5,8,8a - octahydro - 5,8 - methano - 2,3 - naphthalenedicarboxylic anhydride, etc. It is to be understood that the aforementioned acids or anhydrides thereof are only representative of the compounds which may be prepared and that the present invention is not necessarily limited thereto.

Examples of amine compounds which may be selected to form the novel compositions of matter of the present invention possess the generic formula:

in which R is selected from the group consisting of alkyl and aminoalkyl radicals containing from 1 to 20 carbon atoms, polyalkenepolyamino, aryl, aminoaryl, polyarylenepolyamino radicals of from 1 to 3 carbocyclic rings and aminocycloalkyl and polycycloalkenepolyamino radicals having from 4 to 8 carbon atoms in the ring. Specific examples of these compounds which may be used include alkylmonoamines, such as methylamine, ethylamine, propylamine, butylamine, the isomeric pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl amines, etc.; amines prepared from fatty acid derivatives such as tallow amine, hydrogenated tallow amine, lauryl amine, stearyl amine, oleyl amine, linoleyl amine, etc.; alkylene polyamines such as ethylenediamine, propylenediamine (diaminopropane), butylenediamine, pentylenediamine, hexylenediamine, etc., N-alkyl substituted diaminoalkanes such as N-methyl-diaminoethane, N-ethyl-diaminoethane, N-methyl-1,3 - diaminopropane, N-ethyl-1,3-diaminopropane, other N-alkyl-1,3-diaminopropanes in which the alkyl group may contain carbon atoms ranging from 2 up to about 20 carbon atoms and thus the alkyl group is selected from hexyl, heptyl, octyl, nonadecyl, undecyl, dodecyl, tridecyl, tetradecyl, etc. radicals. In addition, other N-alkyl diaminoalkanes such as the N-alkyl-1,4-diaminobutanes, N - alkyl - 1,2 - diaminopentanes, N - alkyl-1,5-diaminopentanes, N - alkyl-1,2-diaminohexanes, N-alkyl-1,3 - diaminohexanes, N-alkyl-1,6-diaminohexanes, etc., may also be used.

Other amine compounds which may be used include polyalkylenepolyamines and N-substituted derivatives thereof including diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetetramine, tripentylenetetramine, trihexylenetetramine, triheptylenetetramine, trioctylenetetramine, etc., tetraethylenepentamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc., $N^1,N^3$-dimethyldiethylenetriamine, $N^1,N^3$-diethyldiethylenetriamine, $N^1,N^3$ - dipropyldiethylenetriamine, $N^1,N^3$ - di-sec-butyldiethylenetriamine, $N^1,N^3$-dimethyldipropylenetriamine, $N^1,N^3$ - diethyldibutylenetriamine, $N^1,N^3$-di-sec-butyldibutylenetriamine, etc.

Aromatic amines which may be used include monoamines such as aniline, the toluidines, the xylidines, naphthylamine, anthracylamine, etc. as well as the N-mono-alkylated aromatic amines such as N-methylaniline, N - ethylaniline, N - propylaniline, N - butylaniline, N-methyltoluidine, N-ethyltoluidine, etc.; aromatic polyamines such as o-phenylenediamine, m-phenylenediamine, p-phenylenediamine, 1,2-naphthalenediamine, 1,4-naphthalenediamine, 1,2,3 - triaminobenzene, 1,3,5 - triaminobenzene, etc.; polyarylene amines such as diphenylamine, di(p-tolyl)amine, etc.; polyarylenepolyamines such as di-aminodiphenylamine, aminodinaphthylamine, diaminodinaphthylamine. It is to be understood that in the polyamino aromatic compounds the nitrogen atoms may be in a position ortho, meta or para to each other. It may, if so desired, also contain an alkyl group attached to one or both nitrogen atoms, the alkyl groups containing from 1 to 20 or more carbon atoms each. Illustrative compounds include p,p'-dimethylaminodiphenylamine, p,p'-diethylaminodiphenylamine, p,p'-dipropylaminodiphenylamine, p,p' - dibutylaminodiphenylamine, p,p' - diamylaminodiphenylamine, p,p' - dihexylaminodiphenylamine, p,p'-diheptylaminodiphenylamine, p,p' - dioctylaminodiphenylamine, etc.; o,p'-dimethyldiphenylamine, o,p' - diethyldiphenylamine, o,p'-dipropyldiphenylamine, o,p' - dibutyldiphenylamine, etc. It is also contemplated within the scope of this invention that cycloalkylamines, cycloalkylpolyamines and polycycloalkylenepolyamines such as cyclobutylamine, cyclopentylamine, cyclohexylamine, cyclooctylamine, 2-methylcyclobutylamine, 3-methylcyclopentylamine, N - methylcyclohexylamine, N - ethylcyclohexylamine, N-propylcyclohexylamine, o - diaminocyclohexane, m-diaminocyclohexane, p - diaminocyclohexane, 1,2,4-triaminocyclohexane, 1,2,5 - triaminocyclohexane, N,N'-dimethyl-o-diaminocyclohexane, N,N' - dimethyl-p-diaminocyclohexane, etc.; dicyclopentylenetriamine, dicyclohexylenetriamine, tricyclopentylenetetramine, tricyclohexylenetetramine, etc., as well as the N-alkylated derivatives thereof may also be used. It is to be understood that the aforementioned amine compounds are only representatives of the class of compounds falling within the generic formula hereinbefore set forth, and that the present invention is not necessarily limited thereto.

It is also contemplated within the scope of this invention that N-alkyl-1,3-diaminopropanes in which the alkyl group contains from about 8 to about 25 carbon atoms of which a number of the class are commercially available may also be utilized although not necessarily with equivalent results. For example, certain amine compounds known as "Duomeen T" and "Diam 26" in which the alkyl group is derived from tallow and contains from about 12 to about 20 carbon atoms per group and mostly 16 to 18 carbon atoms per group may be utilized as the amine starting material in the present invention.

The desired novel compositions of matter of the present invention comprising either monoamides or diamides may be prepared by condensing a polyhalopolyhydromethanonaphthalenedicarboxylic acid or anhydride thereof of the type hereinbefore set forth in greater detail with an amine compound also of the type hereinbefore set forth in greater detail. It is also contemplated within the scope of the present invention that the novel compositions of matter may be prepared by utilizing an ester of the acid or anhydride which has been prepared by treating said acid or anhydride with a lower alkyl alcohol such as methyl alcohol, ethyl alcohol, the isomeric propyl alcohols, butyl alcohols, amyl alcohols, etc., at esterification conditions to prepare the ester thereof. In the event that the trans diester of the acid is desired, the reaction is effected in the presence of an acidic catalyst such as organic acids including methane sulfonic acid, ethane sulfonic acid, benzene sulfonic acid, toluene sulfonic acid, etc.; inorganic acids such as sulfuric acid, hydrochloric acid, etc. The reaction or esterification is preferably effected in the presence of a substantially inert organic solvent such as benzene, toluene, xylene n-pentane, n-hexane, etc., the temperature of the esterification reaction usually being that of the reflux temperature of the particular solvent or alcohol which is used. The desired ester of the polyhalopolyhydromethanonaphthalenedicarboxylic acid is then condensed with the amine at condensation conditions to form the desired product which comprises a novel composition of matter, said conditions including condensing the reactants at a temperature usually in the range of from about 0° up to about 250° C. or more. In the event that the reaction is effected in the presence of an organic solvent of the type hereinbefore set forth, the reaction may be effected at the reflux temperature of the particular solvent employed. The reaction time will be dependent to some extent upon the particular temperature which is employed and will usually range from about ½ up to about 5 hours or more.

The process in which the novel compositions of matter of a type hereinafter set forth in greater detail are prepared according to this invention may be effected in any suitable manner. In one embodiment, a method for the batch type operation is to utilize the anhydride of a type hereinbefore set forth in greater detail and condense said anhydride with an amine at temperatures ranging from ambient (about 25° C.) up to about 75° C. In another embodiment, the lower alkyl ester of the particular polyhalopolyhydromethanonaphthalenedicarboxylic acid is condensed with the particular amine by heating the mixture until the alcohol which is formed is removed. As hereinbefore set forth, the temperature of the reaction will depend upon variables present in the reaction, said variables including the reflux temperature of the solvent if one is used, the length of residence time which is desired, the particular reactants undergoing condensation, etc.

The amount of amine compound which is present in the reaction mixture will usually be in a range of from about 0.5 to about 10 or more moles of amine compound per mole of polyhalopolyhydromethanonaphthalenedicarboxylic acid, anhydride or ester. For example, if a monoamide of a polyhalopolyhydromethanonaphthalenedicarboxylic acid is desired, the reactants will be present in a range of from about 2:1 to 1:1 mole of polyhalopolyhydromethanonaphthalenedicarboxylic acid, anhydride or ester per mole of amine compound. Conversely, if a diamide is desired, the amine compound will be present in the reaction mixture in a mole excess ranging from about 2 to about 10 or more moles of amine per mole of ester.

Upon completion of the desired residence time which, as hereinbefore set forth, will usually range from about ½ to about 5 hours or more, the solvent if one is used may be removed by conventional means such as distillation, evaporation, etc., and the desired monoamide or diamine recovered.

The novel compositions of matter which are prepared according to the present invention comprise monoamides or diamides having the formula:

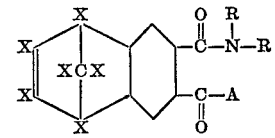

in which R is selected from the group consisting of hydrogen, alkyl and aminoalkyl radicals containing from 1 to 20 carbon atoms, polyalkenepolyamino, aryl, aminoaryl, polyarylenepolyamino of from 1 to 3 carbocyclic rings and aminocycloalkyl and polycycloalkenepolyamino radicals having from 4 to 8 carbon atoms in the ring, A is selected from the group consisting of OR' and

in which R' is hydrogen or an alkyl radical of from 1 to 5 carbon atoms and X is selected from the group consisting of hydrogen and halogen radicals, at least two X's being halogen.

Some specific examples of these compounds include the mono(diethylenediaminoamide) of 5,6,7,8,9,9-hexachloro-1,2,3,4,4a,5,8,8a-octahydro-5,8-methano-2,3-naphthalenedicarboxylic acid, the di(diethylenediaminoamide) of 5,6,7,8,9,9-hexachloro-1,2,3,4,4a-5,8,8a-octahydro-5,8-methano-2,3-naphthalenedicarboxylic acid, the mono(dipropylenediaminoamide) of 5,6,7,8,9,9-hexachloro-1,2,3,4,4a,5,8,8a-octahydro-5,8-methano-2,3-naphthalenedicarboxylic acid, the di(dipropylenediaminoamide) of 5,6,7,8,9,9-hexachloro-1,2,3,4,4a,5,8,8a-octahydro-5,8-methano-2,3-naphthalenedicarboxylic acid, the mono(dibutylenediaminoamide) of 5,6,7,8,9,9-hexachloro-1,2,3,4,4a,5,8,8a-octahydro-5,8-methano-2,3-naphthalene dicarboxylic acid, the di(dibutylenediaminoamide) of 5,6,7,8,9,9-hexachloro-1,2,3,4,4a,5,8,8a-octahydro-5,8-methano-2,3-naphthalenedicarboxylic acid, the mono(ethyleneaminoamide) of 5,6,7,8,9,9-hexachloro-1,2,3,4,4a,5,8,8a-octahydro-5,8-methano-2,3-naphthalenedicarboxylic acid, the di(ethyleneaminoamide) of 5,6,7,8,9,9-hexachloro-1,2,3,4,4a,5,8,8a-octahydro-5,8-methano-2,3-naphthalenedicarboxylic acid, the mono-(propyleneaminoamide) of 5,6,7,8,9,9-hexachloro-1,2,3,4,4a,5,8,8a-octahydro-5,8-methano-2,3-naphthalenedicarboxylic acid, the di(propyleneaminoamide) of 5,6,7,8,9,9-hexachloro-1,2,3,4,4a,5,8,8a-octahydro-5,8-methano-2,3-naphthalene-dicarboxylic acid, the mono(N,N'-diethyldiethlyenediaminoamide) of 5,6,7,8,9,9-hexachloro-1,2,3,4,4a,5,8,8a-octahydro-5,8-methano-2,3-naphthalenedicarboxylic acid, the di(N,N'-diethyldiethylenediaminoamide) of 5,6,7,8,9,9-hexachloro-1,2,3,4,4a,5,8,8a-octahydro-5,8-methano-2,3-naphthalene--dicarboxylic acid, the mono(N,N'-di-sec-butyldiethylenediaminoamide) of 5,6,7,8,9,9-hexachloro-1,2,3,4,4a,5,8,8a-octahydro-5,8-methano-2,3-naphthalenedicarboxylic acid, the di(N,N'-di-sec-butyldiethylenediaminoamide) of 5,6,7,8,9,9-hexachloro-1,2,3,4,4a,5,8,8a-octahydro-5,8-methano-2,3-naphthalenedicarboxylic acid, the mono(phenyleneaminoamide) of 5,6,7,8,9,9-hexachloro-1,2,3,4,4a,5,8,8a-octahydro-5,8-methano-2,3-naphthalenedicarboxylic acid, the di(phenyleneaminoamide) of 5,6,7,8,9,9-hexachloro-1,2,3,4,4a,5,8,8a-octahydro-5,8-methano-2,3-naphthalenedicarboxylic acid, the mono(diphenyldiaminoamide) of 5,6,7,8,9,9-hexachloro-1,2,3,4,4a,5,8,8a-octahydro-5,8-methano-2,3-naphthalenedicarboxylic acid, the di(diphenyldiaminoamide) of 5,6,7,8,9,9-hexachloro-1,2,3,4,4a,5,8,8a-octahydro-5,8-methano-2,3-naphthalenedicarboxylic acid, the mono(cyclohexyleneaminoamide) of 5,6,7,8,9,9-hexachloro-1,2,3,4,4a,5,8,8a-octahydro-5,8-methano-2,3-naphthalenedicarboxylic acid, the di(cyclohexyleneaminoamide) of 5,6,7,8,9,9-hexachloro-1,2,3,4,4a,5,8,8a-octahydro-5,8-methano-2,3-naphthalenedicarboxylic acid, the mono(cyclopentyleneaminoamide) of 5,6,7,8,9,9-hexachloro-1,2,3,4,4a,5,8,8a-octahydro-5,8-methano-2,3-naphthalenedicarboxylic acid, the di(cyclopentyleneaminoamide) of 5,6,7,8,9,9-hexachloro-1,2,3,4,4a,5,8,8a-octahydro-5,8-methano-2,3-naphthalenedicarboxylic acid, the mono(diaminocyclohexyleneamide) of 5,6,7,8,9,9-hexachloro-1,2,3,4,4a,5,8,8a-octahydro-5,8-methano-2,3-naphthalenedicarboxylic acid, the di(diaminocyclohexyleneamide) of 5,6,7,8,9,9-hexachloro-1,2,3,4,4a,5,8,8a-octahydro-5,8-methano-2,3-naphthalenedicarboxylic acid, the corresponding mono- and di(N-alkylated amides of 5,6,7,8,9,9-hexachloro-1,2,3,4,4a,5,8,8a-octahydro-5,8-methano-2,3-naphthalenedicarboxylic acid, the corresponding monoamides and diamides of 5,6,7,8,9,9-hexabromo-1,2,3,4,4a,5,8,8a-octahydro-5,8-methano-2,3-naphthalenedicarboxylic acid.

It is to be understood that the aforementioned compounds are only representative of the class of compounds which may be prepared and that the present invention is not necessarily limited thereto.

The following examples are given to illustrate the process of the present invention which, however are not intended to limit the generally broad scope of the present invention in strict accordance therewith.

EXAMPLE I

To a reaction flask fitted with stirring means and a nitrogen well was charged 201 g. (1.0 mole) of N,N'-di-sec-butyldiethylenetriamine. The flask was immersed in an ice bath to lower the temperature of the amine to about 3° C. Following this, 42 g. (0.1 mole) of 5,6,7,8,9,9 - hexachloro-1,2,3,4,4a,5,8,8a-octahydro-5,8-methano-2,3-naphthalenedicarboxylic anhydride was slowly added during a period of about 15 minutes. The reaction was exothermic in nature, the well temperature reaching approximately 15° C. The reaction mixture was allowed to reach room temperature by removal from the ice bath and thereafter was heated to a temperature of about 210° C. for a period of ½ hour. Following this, the mixture was allowed to cool to room temperature and the excess amine was removed by vacuum distillation. The reaction product comprised the di(N,N'-di-sec-butyldiethylenediaminoamide) of 5,6,7,8,9,9 - hexachloro-1,2,3,4,4a,5,8,8a-octahydro-5,8-methano-2,3-naphthalene-dicarboxylic acid.

The monoamide is prepared by charging 100 g. (0.5 mole) of N,N'-di-sec-butyldiethylenetriamine to a reaction flask similar to that used in the above paragraph. The flask is then immersed in an ice bath until the temperature of the amine is about 3° C. Thereafter, 212 g. (0.5 mole) of 5,6,7,8,9,9-hexachloro-1,2,3,4,4a,5,8,8a-octahydro-5,8-methano-2,3-naphthalenedicarboxylic anhydride is slowly added to the flask during a period of about 15 minutes. The reaction mixture is allowed to reach room temperature and stirred for a period of 5 hours. From the resulting mixture is isolated the reaction product comprising the mono-(N,N'-di-sec-butyldiethylenediaminoamide) of 5,6,7,8,9,9 - hexachloro-1,2,3,4,4a,5,8,8a-octahydro-5,8-methano-2,3-naphthalenedicarboxylic acid is recovered.

EXAMPLE II

In this example, 120 g. (2.0 mole) of ethylenediamine is charged to a reaction flask. The flask is immersed in an ice bath to lower the temperature to about 5° C. Following this, 94 g. (0.2 mole) of the dimethyl ester of 5,6,7,8,9,9-hexachloro - 1,2,3,4,4a,5,8,8a - octahydro-5,8-methano-2,3-naphthalenedicarboxylic anhydride is slowly added during a period of about 15 minutes. The reaction mixture is allowed to warm to room temperature after removal of the flask from the ice bath. Following this, the mixture is heated and the methyl alcohol removed by distillation. When all the alcohol has been removed the excess ethylenediamine is distilled off and the desired product comprising the di(ethyleneaminoamide) of 5,6,7,8,9,9-hexachloro - 1,2,3,4,4a,5,8,8a - octahydro-5-8-methano-2,3-naphthalenedicarboxylic acid is separated and recovered.

The monoamide is prepared by charging 60 g. (1.0 mole) of ethylenediamine to a reaction flask and immersing said flask in an ice bath to lower the temperature to about 5° C. Following this, 212 g. (1.0 mole) of 5,6,7,8,9,9-hexachloro - 1,2,3,4,4a,5,8,8a - octahydro-5,8-methano-2,3-naphthalenedicarboxylic anhydride is slowly added during a period of about 15 minutes and thereafter the reaction mixture is allowed to come to room temperature by removing said flask from the ice bath. The flask is then heated to a temperature of about 50° C. for a period of about 1 hour. Following this, the flask is allowed to cool to room temperature and the desired product comprising the mono(ethyleneaminoamide) of 5,6,7,8,9,9-hexachloro-1,2,3,4,4a,5,8,8a-octahydro - 5,8-methano-2,3-naphthalenedicarboxylic acid is separated.

EXAMPLE III

A reaction flask provided with stirring means is immersed in an ice bath and 103 g. (1.0 mole) of diethylenetriamine is added thereto. Following this, 47 g. (0.1 mole) of the dimethyl ester of 5,6,7,8,9,9-hexachloro-1,2,3,4,4a,5,8,8a-octahydro-5,8-methano - 2,3-naphthalenedicarboxylic acid is slowly added thereto during a period of about 15 minutes. The flask containing the reaction mixture is removed from the ice bath and allowed to warm to room temperature. Following this, the mixture is heated and the methyl alcohol removed by distillation. When all the alcohol has been removed the excess diethylenetriamine is removed by distillation and the desired product comprising the di(diethylenediaminoamide) of 5,6,7,8,9,9-hexachloro-1,2,3,4,4a,5,8,8a-octahydro-5,8-methano-2,3-naphthalenedicarboxylic acid is recovered.

To prepare the monoamide corresponding to the diamide prepared according to the above paragraph, 51.5 g. (0.5 mole) of diethylenetriamine is placed in a reaction flask which is cooled to a temperature of about 5° C. Following this, 425 g. (1.0 mole) of 5,6,7,8,9,9-hexachloro - 1,2,3,4,4a,5,8,8a - octahydro - 5,8 - methano-2,3-naphthalenedicarboxylic anhydride is added to the flask during a period of 15 minutes. After allowing the flask to warm to room temperature, the mixture is heated to a temperature of about 50° C. for a period of about 1 hour. At the end of this time, the flask and contents thereof are allowed to cool to room temperature and the desired product comprising the mono(diethylenediaminoamide) of 5,6,7,8,9,9-hexachloro-1,2,3,4,4a,5,8,8a-octahydro-5,8-methano-2,3-naphthalenedicarboxylic acid is recovered by conventional means.

EXAMPLE IV

To a reaction flask immersed in an ice bath is added 200 g. (1.0 mole) of diaminodiphenylamine dissolved in toluene. The temperature of the amine mixture is reduced to about 5° C. and there is slowly added thereto 47 g.

(0.1 mole) of the dimethyl ester of 5,6,7,8,9,9-hexachloro-1,2,3,4,4a,5,8,8a-octahydro - 5,8 - methano - 2,3-naphthalenedicarboxylic acid. This methyl ester is prepared by treating 5,6,7,8,9,9-hexachloro-1,2,3,4,4a,5,8,8a-octahydro-5,8-methano-2,3-naphthalenedicarboxylic acid with methyl alcohol in the presence of an acidic catalyst to form the aforementioned diester. Following this, the flask is removed from the ice bath and allowed to warm to room temperature. The flask and contents thereof are then heated and the methyl alcohol removed by distillation. When all the alcohol has been distilled the excess diaminodiphenyleneamine is removed and the desired product comprising the di(diphenyldiaminoamide) of 5,6,7,8,9,9 - hexachloro - 1,2,3,4,4a,5,8,8a - octahydro-5,8-methano-2,3-naphthalenedicarboxylic acid is separated and recovered.

In like manner, the monoamide is prepared by reacting 100 g. (0.5 mole) of diaminodiphenylamine which is dissolved in toluene with 212 g. (0.5 mole) of 5,6,7,8,9,9-hexachloro - 1,2,3,4,4a,5,8,8a-octahydro-5,8-methano-2,3-naphthalenedicarboxylic anhydride in a manner similar to that set forth in the above examples. Upon completion of the desired heating and cooling, the product comprising the mono(diphenyldiaminoamide) of 5,6,7,8,9,9-hexachloro - 1,2,3,4,4a,5,8,8a-octahydro-5,8-methano-2,3-naphthalenedicarboxylic acid is separated from the unreacted starting materials and diamide by conventional means and recovered.

EXAMPLE V

In this example, a reaction vessel is charged with 189 g. (1.0 mole) of tetraethylenepentamine along with 150 cc. of benzene. The system is refluxed using a Dean-Stark trap to remove any water which may be present. To the dry system is added 47 g. (0.1 mole) of the dimethyl ester of 5,6,7,8,9,9-hexachloro-1,2,3,4,4a,5,8,8a-octahydro-5,8-methano-2,3-naphthalenedicarboxylic acid during a period of about 1 hour. The mixture is then heated to reflux (approxmiately 85° C.) and maintained until the reaction is completed. At the end of this time the reaction mixture is subjected to distillation, the solvent and the excess tetraethylenepentamine is removed and the desired reaction product comprising the ditetraethylenetetraminoamide) of 5,6,7,8,9,9-hexachloro-1,2,3,4,4a,5,8,8a-octahydro-5,8-methano-2,3-naphthalenedicarboxylic acid is recovered.

To prepare the monoamide, 95 g. (0.5 mole) of tetraethylenepentamine which is dissolved in 100 cc. of benzene is condensed with 212 g. (0.5 mole) of 5,6,7,8,9,9-hexachloro - 1,2,3,4,4a,5,8,8a-octahydro-5,8-methano-2,3-naphthalenedicarboxylic anhydride at 30°–35° C. for a period of about 1 hour. At the end of this time, the solvent is removed by distillation and the desired product comprising the mono(tetraethylenetetraaminoamide) of 5,6,7,8,9,9-hexachloro-1,2,3,4,4a,5,8,8a-octahydro-5,8-methano-2,3-naphthalenedicarboxylic acid is recovered.

EXAMPLE VI

To a reaction flask is added 112 g. (1.0 mole) of 1,4-diaminocyclohexane along with 150 cc. of benzene. To this there is slowly added 47 g. (0.1 mole) of the diethyl ester of 5,6,7,8,9,9-hexachloro-1,2,3,4,4a,5,8,8a-octahydro-5,8-methano-2,3-naphthalenedicarboxylic acid during a period of about 1 hour. The reaction mixture is then refluxed at a temperature of about 85° C. for an additional period of about 15 hours. At the end of this time, the solvent and excess amine compound are removed by conventional means. The desired product comprising the di (cyclohexylaminoamide) of 5,6,7,8,9,9-hexachloro-1,2,3,4,4a,5,8,8a - octahydro-5,8-methano-2,3-naphthalenedicarboxylic acid is recovered.

The monoamide is prepared by dissolving 56 g. (0.5 mole) is 1,4-diaminocyclohexane in 100 cc. of benzene and slowly adding thereto 319 g. (0.75 mole) of 5,6,7,8,9,9-hexachloro-1,2,3,4,4a,5,8,8a-octahydro-5,8-methano-2,3-naphthalenedicarboxylic anhydride during a period of 1 hour. The reaction mixture is then allowed to stir for an additional period of about 6 hours. At the end of this time, the solvent and unreacted starting materials are removed by conventional means. The desired product which comprises the mono(cyclohexylaminoamide) of 5,6,7,8,9,9-hexachloro-1,2,3,4,4a,5,8,8a-octahydro-5,8-methano-2,3-naphthalenedicarboxylic acid is separated.

EXAMPLE VII

In this example, 93 g. (1.0 mole) of aniline along with 100 cc. of benzene is placed in a reaction vessel. The reaction mixture is maintained at room temperature and 50 g. (0.1 mole) of the diethyl ester of 5,6,7,8,9,9-hexachloro - 1,2,3,4,4a,5,8,8a-octahydro-5,8-methano-2,3-naphthalenedicarboxylic acid is slowly added thereto during a period of about 1 hour. The mixture is then heated at reflux for an additional period of two hours. The ethyl alcohol and excess aniline are removed by distillation and the desired product comprising the di(phenylamide) of 5,6,7,8,9,9 - hexachloro - 1,2,3,4,4a,5,8,8a-octahydro-5,8-methano-2,3-naphthalenedicarboxylic acid is recovered.

To prepare the monoamide, 9.3 g. (0.1 mole) of aniline along with 50 cc. of benzene is placed in a reaction vessel and 85 g. (0.2 mole) of 5,6,7,8,9,9-hexachloro-1,2,3,4,4a,5,8,8a - octahydro-5,8-methano-2,3-naphthalenedicarboxylic anhydride is slowly added thereto during a period of about 1 hour. The resultant mixture is then heated at reflux (approximately 85° C.) for an additional period of about 4 hours. At the end of this time, the solvent and unreacted starting materials are removed by conventional means and the desired mono(phenylamide) of 5,6,7,8,9,9-hexachloro - 1,2,3,4,4a,5,8,8a-octahydro-5,8-methano-2,3-naphthalenedicarboxylic acid is recovered.

EXAMPLE VIII

To a reaction flask is added 207 g. (1.0 mole) of p,p'-diaminodicyclohexylamine along with 200 cc. of toluene. To this there is slowly added 50 g. (0.1 mole) of the diethyl ester of 5,6,7,8,9,9-hexachloro-1,2,3,4,4a,5,8,8a-octahydro - 5,8 - methano-2,3-naphthalenedicarboxylic acid, said addition taking place during a period of about 1 hour. The reaction mixture is then refluxed at a temperature of about 115° C. for an additional period of about 2 hours. At the end of this time the excess amine compound is removed by distillation. The desired product comprising the di(dicyclohexyldiaminoamide) of 5,6,7,8,9,9-hexachloro - 1,2,3,4,4a,5,8,8a-octahydro-5,8-methano-2,3-naphthalenedicarboxylic acid is recovered.

To prepare the monoamide, 103 g. (0.5 mole) of p,p'-diaminodicyclohexylamine in 100 cc. of toluene is placed in a reaction flask and 210 g. (0.5 mole) of 5,6,7,8,9,9-hexachloro - 1,2,3,4,4a,5,8,8a-octahydro-5,8-methano-2,3-naphthalenedicarboxylic anhydride is slowly added thereto during a period of 1 hour. The reaction mixture is then heated to 50° C. for an additional period of 2 hours. At the end of this time, the solvent and unreacted starting materials are removed by conventional means and the desired product comprising the mono(dicyclohexyldiaminoamide) of 5,6,7,8,9,9-hexachloro-1,2,3,4,4a,5,8,8a-octahydro-5,8-methano-2,3-naphthalenedicarboxylic acid is recovered.

We claim as our invention:

1. A compound selected from the group consisting of the monoamides and diamides of a polyhalopolyhydromethanonaphthalenedicarboxylic acid having the formula:

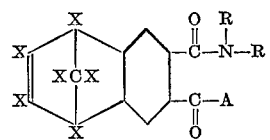

in which R is selected from the group consisting of hydrogen, alkyl and amino alkyl radicals containing from 1 to 20 carbon atoms, polyalkenepolyamino, aryl, aminoaryl, polyarylenepolyamino of from 1 to 3 carbocyclic rings and aminocycloalkyl and polycycloalkenepolyamino radicals having from 4 to 8 carbon atoms in the ring, A is selected from the group consisting of OR' and

in which R' is hydrogen or an alkyl radical of from 1 to 5 carbon atoms and X is selected from the group consisting of hydrogen and halogen radicals, at least two X's being halogen.

2. The compound of claim 1 being a compound having the formula:

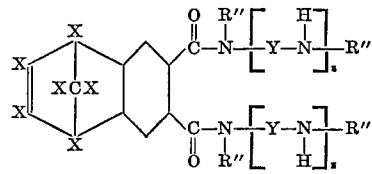

in which Y is a radical selected from the group consisting of alkylene of from 2 to about 6 carbon atoms, phenyl, cyclopentyl and cyclohexyl, R" is selected from the group consisting of hydrogen and alkyl of from 1 to about 5 carbon atoms, X is selected from the group consisting of hydrogen and halogen, at least two X's being halogen and z is an integer of from 1 to about 5.

3. The compound of claim 1 being a mono(polyalkylenepolyaminoamide) of a polyhalopolyhydromethanonaphthalenedicarboxylic acid, in which each of the alkylene groups contains from 2 to 6 carbon atoms.

4. The compound of claim 1 being a mono(polyphenylenepolyaminoamide) of a polyhalopolyhydromethanonaphthalenedicarboxylic acid.

5. The compound of claim 1 being a mono(alkylaminoamide) of a polyhalopolyhydromethanonaphthalenedicarboxylic acid in which each of the alkyl groups contains from 2 to 6 carbon atoms.

6. The compound of claim 1 being a mono(alkylenepolyaminoamide) of a polyhalopolyhydromethanonaphthalenedicarboxylic acid in which each of the alkylene groups contains from 2 to 6 carbon atoms.

7. The compound of claim 2 being a di(polyalkylenepolyaminoamide) of a polyhalopolyhydromethanonaphthalenedicarboxylic acid, in which each of the alkylene groups contains from 2 to 6 carbon atoms.

8. The compound of claim 2 being a di(polyphenylenepolyaminoamide) of a polyhalopolyhydromethanonaphthalenedicarboxylic acid.

9. The compound of claim 2 being a di(alkylaminoamide) of a polyhalopolyhydromethanonaphthalenedicarboxylic acid in which each of the alkyl groups contains from 2 to 6 carbon atoms.

10. The compound of claim 2 being a di(alkylenepolyaminoamide) of a polyhalopolyhydromethanonaphthalenedicarboxylic acid in which each of the alkylene groups contains from 2 to 6 carbon atoms.

11. The compound of claim 1 being the mono(diethylenediaminoamide) of 5,6,7,8,9,9-hexachloro-1,2,3,4,4a,5,8,8a-octahydro - 5,8 - methano-2,3-naphthalenedicarboxylic acid.

12. The compound of claim 1, being the mono(ethyleneaminoamide) of 5,6,7,8,9,9-hexachloro-1,2,3,4,4a,5,8,8a-octahydro - 5,8 - methano-2,3-naphthalenedicarboxylic acid.

13. The compond of claim 1 being the mono(di-sec-butylethylenediaminoamide) of 5,6,7,8,9,9-hexachloro-1,2,3,4,4a,5,8,8a-octahydro-5,8-methano - 2,3 - naphthalenedicarboxylic acid.

14. The compound of claim 1 being the mono(di-butyldiaminoamide) of 5,6,7,8,9,9-hexachloro-1,2,3,4,4a,5,8,8a-octahydro - 5,8 - methano - 2,3 - naphthalenedicarboxylic acid.

15. The compound of claim 1 being the mono(tetraethylenetetraaminoamide) of 5,6,7,8,9,9-hexachloro-1,2,3,4a,5,8,8a-octahydro - 5,8 - methano - 2,3-naphthalenedicarboxylic acid.

16. The compound of claim 2 being the di(diethylenediaminoamide) of 5,6,7,8,9,9 - hexachloro - 1,2,3,4,4a,5,8,8a - octahydro - 5,8-methano-2,3-naphthalenedicarboxylic acid.

17. The compound of claim 2 being the di(ethyleneaminoamide) of 5,6,7,8,9,9-hexachloro-1,2,3,4,4a,5,8,8a-octahydro-5,8-methano-2,3-naphthalenedicarboxylic acid.

18. The compound of claim 2 being the di(di-sec-butyldiethylenediaminoamide) of 5,6,7,8,9,9-hexachloro-1,2,3,4,4a,5,8,8a-octahydro-5,8 - methano-2,3 - naphthalenedicarboxylic acid.

19. The compound of claim 2 being the di(dibutyldiaminoamide) of 5,6,7,8,9,9-hexachloro-1,2,3,4,4a,5,8,8a-octahydro - 5,8 - methano - 2,3 - naphthalenedicarboxylic acid.

20. The compound of claim 2 being the di(tetraethylenetetraaminoamide) of 5,6,7,8,9,9-hexachloro-1,2,3,4,4a,5,8,8a - octahydro - 5,8 - methano - 2,3 - naphthalenedicarboxylic acid.

References Cited

UNITED STATES PATENTS 3,280,143   10/1966   Hayes _____ 260—326

LORRAINE A. WEINBERGER, Primary Examiner

PAUL J. KILOS, Assistant Examiner

U.S. Cl. X.R.

260—468, 471, 518, 557